3,473,985
POROUS PLASTIC
Porter W. Erickson, Silver Spring, Md., assignor to the United States of America as represented by the Secretary of the Navy
No Drawing. Filed Aug. 28, 1964, Ser. No. 392,964
Int. Cl. C03c *15/00;* B32b *31/14*
U.S. Cl. 156—24                                  2 Claims

ABSTRACT OF THE DISCLOSURE

This invention relates to porous plastic articles and the method of them which leaches the roving out of a section cut transversely from a ring of continuous roving reinforced plastic material.

---

The invention described herein may be manufactured and used by or for the Government of the United States of America for governmental purposes without the payment of any royalties thereon or therefor.

This invention relates to the manufacture of porous plastic articles. More particularly, the invention relates to a porous plastic filter and a novel process for its manufacture.

Both natural and synthetic filters have been used in the past for separating solids from gases or liquids, separating isotopes of an element from one another (Graham's Law), and other like uses. Natural materials such as paper, cloth, asbestos and the like were early found to lack chemical resistance to the mateirals being filtered. Consequently, chemically resistant synthetic materials have been sought.

One example of a filter which satisfactorily resists chemical action is a filter made of sintered Teflon. Another example is a microporous plastic filter, made by leaching the starch from a starch impregnated thermoplastic film, described in U.S. Patent 3,062,760 to Dermody et al., issued Nov. 6, 1962. A common limitation of prior art filters, however, is that, when making them, it is difficult to control their porosity and permeability. It is therefore necessary to make a batch of the material, fabricate the filters and then test and assort the filters to obtain those with the desired permeability. Waste of materials and time is inherent in such a procedure. Another important disadvantage of these filter materials is that most of them cannot be reclaimed by reverse flushing.

It is accordingly an object of the present invention to overcome the above-mentioned difficulties by providing a porous plastic material for use as a filter which will have a uniform pore geometry throughout and in which the pore size can be easily controlled. Thus, the fluid permeasibilty can be accurately predetermined as well as the "sieve" characteristic, that is, the characteristic analogous to the mesh size of a filter screen.

Another object of the invention is to provide a method of making a porous plastic article, which method is easy to cary out and which enables the physical properties of the material produced to be accurately predetermined.

Briefly stated, the invention comprises leaching the reinforcement out of a filament-wound reinforced plastic body, thus leaving uniform circular passages extending from one face to another of the body. The pore diameter, and consequently the permeability, is easily controlled by varying the diameter of the filament used to wind-up the body.

Considering the invention in more detail, the invention comprises winding a fine diameter roving which is coated with a thermosetting resin onto a circular mandrel so as to make a ring, this procedure being generally well known in the art.

The roving may be glass or many natural or synthetic polymeric materials which can be obtained in continuous filamentary form and which is soluble in a leaching agent in which the matrix material is insoluble. The winding is continued until the cross-sectional area of the ring is equivalent to the desired cross-sectional area of the finished filter. The plastic in the ring is then cured.

After the ring has cured, it is cut or sliced transversely in order to provide a plurality of substantially rectangular sections having the desired thickness and having the glass fibers contained therein extending from one face to a parallel opposite face thereof. The cutting may be accomplished, for example, by means of a water-cooled diamond or carborundum wheel.

In order to produce the desired through passages in the various sections as made by the preceding step, the roving is leached out by an agent which does no attack the plastic material of the matrix. If the roving is nylon, for example, the leaching agent may be hydrochloric acid. For glass, a mixture of hydrofluoric and hydrochloric acids has been found to be suitable, the hydrofluoric acid being required for the silicon, in the glass. In this step, the sections are immersed in the acid bath and allowed to remain there for a sufficient length of time for all the roving to be removed by chemical action and solution in the acid. Depending upon section thickness and the materials employed, this may take a period of several days. After the required time, the sections are removed from the acid bath, are cleaned and dried and the resulting filters are then complete.

Considering the physical properties of the porous plastic material as made by the present method, it is noted that this material fits almost exactly the straight, parallel capillary model of a porous substance as described by Scheidegger in his book "Physics of Flow Through Porous Media," McMillan, New York, 1957 starting at page 92. While the capillaries in the present substance are slightly curved because of the curvature of the ring from which they are cut, this curvature may be disregarded since the radius of curvature of the ring is relatively long and the sections are relatively thin. The permeability k of this substance, as derived from the Hagen-Poiseuille law and Darcy's law, is as follows:

$$k = \frac{n\pi\delta^4}{128}$$

where $n$=the number of capillaries per unit area, and $\delta$ is the diameter of the capillary.

As one example, a ring was formed with an Owens-Corning type "G" glass roving, which has a diameter of $3.6 \times 10^{-4}$ in. This ring contained $6.7 \times 10^6$ filaments per square inch of cross-section. Solution of the above equation for these values yields the value $2.76 \times 10^{-9}$ in.$^2$ as the permeability of this substance. For comparison with natural materials, it is pointed out that this permeability is roughly that of the more permeable leathers.

Another sample was made from a ring made of Owens-Corning type "D" fibers which have a diameter of $2.1 \times 10^{-4}$ in. For this ring, $n$ was $19.7 \times 10^6$ and the resultant permeability is $9.4 \times 10^{-10}$ in.$^2$. This compares favorably with less permeable leathers.

The method as described herein is applicable to any plastic resin which is suitable for use in fiber reinforced materials. This makes the substance adaptable to use in different chemical environments simply by choosing the resin for its particular chemical resistance. As stated above, the pore size and permeability are controllable simply by the choice of the particular filament diameter. Moreover, because of its simple geometry, the filter according to the present invention is readily reclaimable by reverse flushing. It can therefore be seen that a method has been described which is simple to carry out and which produces a highly superior filter as the product.

It is to be understood that within the scope of the appended claims the invention may be practiced otherwise than as specifically described.

What is claimed is:

1. A method of making a porous and permeable plastic body of predetermined permeability comprising
    forming a reinforced plastic ring by winding a predetermined number of turns of a continuous plastic resin coated continuous glass filament roving of predetermined diameter on a suitable form,
    curing said resin,
    cutting said ring transversely to obtain a plurality of sections of predetermined thickness, the roving in each section thereby being exposed at opposite surfaces of said sections, and
    leaching the roving out of said sections.

2. The method of claim 1 in which the leaching step is carried out by immersing said sections in a bath composed of a mixture of hydrofluoric and hydrochloric acids.

References Cited
UNITED STATES PATENTS 2,623,241   12/1952   Mackay et al. _____ 156—155
3,220,960   11/1965   Wichterle et al. _____ 260—49

MURRAY TILLMAN, Primary Examiner

W. J. BRIGGS, Sr., Assistant Examiner

U.S. Cl. X.R.

156—174, 175, 155; 260—2.5